US008027696B2

(12) United States Patent
Wiatrowski et al.

(10) Patent No.: US 8,027,696 B2
(45) Date of Patent: Sep. 27, 2011

(54) METHOD AND APPARATUS FOR ALLOCATING CHANNEL RESOURCES IN A WIRELESS COMMUNICATION SYSTEM

(75) Inventors: David G. Wiatrowski, Woodstock, IL (US); Donald G. Newberg, Hoffman Estates, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 611 days.

(21) Appl. No.: 11/965,875

(22) Filed: Dec. 28, 2007

(65) Prior Publication Data

US 2009/0168732 A1 Jul. 2, 2009

(51) Int. Cl.
*H04L 12/16* (2006.01)
*H04Q 11/00* (2006.01)
*H04B 7/216* (2006.01)
*H04B 7/00* (2006.01)

(52) U.S. Cl. ........ 455/518; 455/517; 455/519; 455/520; 370/266; 370/269; 370/335; 370/342

(58) Field of Classification Search .................. 455/517, 455/518, 519, 520; 370/266, 269, 335, 342
See application file for complete search history.

(56) References Cited

U.S. PATENT DOCUMENTS

| 6,763,015 | B1* | 7/2004 | Phillips et al. | 370/347 |
|---|---|---|---|---|
| 6,944,137 | B1* | 9/2005 | Pan et al. | 370/266 |
| 7,684,816 | B2* | 3/2010 | Furrer et al. | 455/518 |
| 7,889,702 | B2* | 2/2011 | Proctor, Jr. | 370/335 |
| 2004/0005904 | A1* | 1/2004 | Wolf et al. | 455/519 |
| 2005/0277383 | A1* | 12/2005 | Reid | 455/15 |
| 2007/0238477 | A1* | 10/2007 | Furrer et al. | 455/518 |
| 2008/0186934 | A1* | 8/2008 | Khan et al. | 370/342 |
| 2009/0168732 | A1* | 7/2009 | Wiatrowski et al. | 370/337 |

FOREIGN PATENT DOCUMENTS

| EP | 0978958 A1 | 4/1998 |
|---|---|---|
| EP | 1460816 A1 | 3/2003 |
| GB | 2416273 A | 7/2004 |
| WO | WO2007146476 A | 12/2007 |
| WO | WO2008032042 A | 3/2008 |

OTHER PUBLICATIONS

PCT Search Report Dated Jun. 22, 2009.
PCT International Preliminary Report on Patentability Dated Jul. 8, 2010.

* cited by examiner

*Primary Examiner* — Temesghen Ghebretinsae
*Assistant Examiner* — Bobbak Safaipour
(74) *Attorney, Agent, or Firm* — Indira Saladi; Terri S. Hughes; Daniel R. Bestor (57) ABSTRACT

Disclosed is a method for dynamically allocating channel resources in a wireless communication system. A request for a channel resource by a new talkgroup call is received. Whether the new talkgroup call is associated to an associated communication based upon an operational relationship of the new talkgroup call to the associated communication is determined. The channel resource for the new talkgroup call based upon the operational relationship is allocated.

20 Claims, 3 Drawing Sheets

METHOD AND APPARATUS FOR ALLOCATING CHANNEL RESOURCES IN A WIRELESS COMMUNICATION SYSTEM

FIELD OF THE INVENTION

The present invention generally relates to wireless communication systems and more particularly to allocating channel resources in a wireless communication system.

BACKGROUND

A wireless communication system may generally comprise a group of subscribers and a set of stationary "base radios" (also known as "repeaters"). The subscribers are typically endpoints of a communication path taking place on a channel resource, e.g. a voice channel, of the wireless communication system and repeaters are typically the intermediaries by which the communication path to a subscriber may be established or maintained. There may be a number of communications taking place in the wireless communication system. One type of communication, called a talkgroup call, allows a user of one subscriber to speak while other subscribers listen. The group of subscribers participating in the talkgroup call are called the talkgroup. Because of the number of communications taking place in the wireless communication system, a user may wish to participate in one talkgroup call while monitoring other communications.

As is known, one way to participate in one talkgroup call while monitoring a second talkgroup is to use embedded signaling to indicate priority talkgroups. Because embedded signaling is used to implement this approach, the performance of the wireless communication system may degrade. To avoid performance degradation and to facilitate the ability to participate in one talkgroup call while monitoring other communications requires that the channel resources in the wireless communication system be allocated in such a way to facilitate the ability. Accordingly, there is a need for a new way of allocating channel resources in a wireless communication system.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to aid in the understanding of the embodiments of the present invention.

DETAILED DESCRIPTION

Before describing in detail examples that are in accordance with the present invention, it should be observed that the examples reside primarily in allocating channel resources in a wireless communication system. Accordingly, the apparatus and method components have been represented where appropriate by conventional symbols in the drawings, showing only those specific details that are pertinent to understanding the examples of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

Figure 1:
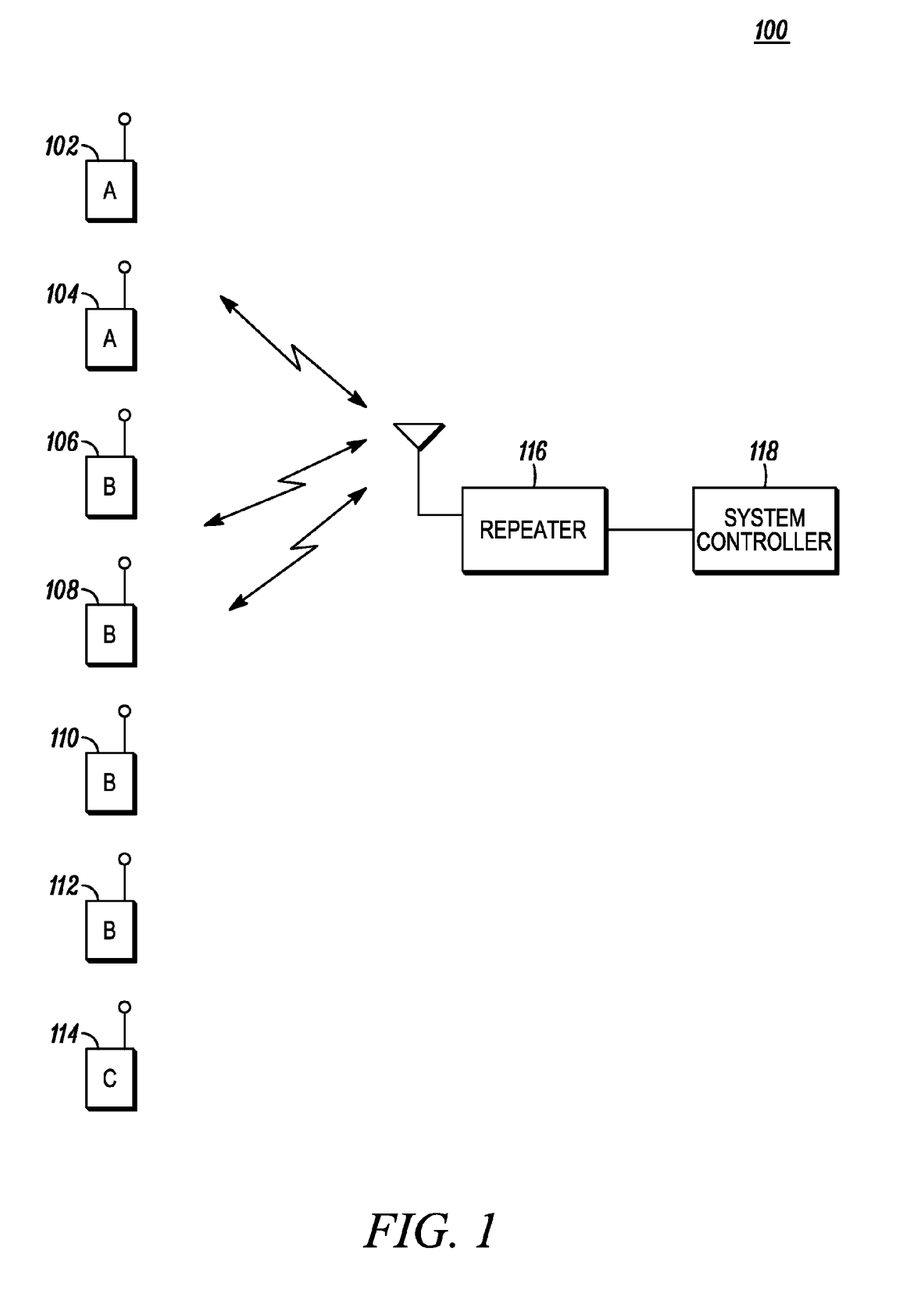
FIG. 1 illustrates a system diagram of a wireless communication system configured in accordance with one example of the invention.

FIG. 1 illustrates a system diagram of a wireless communication system 100, which comprises a plurality of subscribers 102-114, at least one repeater 116, and a system controller 118. The subscribers which are a part of the wireless communication system 100 communicate with the system controller 118 over channel resources in order to use the wireless communication system 100 for communications. The repeater 116 facilitates the communications in the wireless communication system 100 by retransmitting received communications to the system controller 118 and subscribers in the wireless communication system 100.

As used herein, communications means voice, data, and control signaling sent between the subscribers, repeater, and system controller. One example of a communication in the wireless communication system 100 is a talkgroup call. A talkgroup call is voice information on a channel resource generally termed a traffic channel. Another example of a communication in the wireless communication system 100 is a text message. A text message is data information on a channel resource generally termed a data channel. As is known, other examples of communications exist and would generally fall within the definition of voice, data, and control signaling.

The wireless communication system 100 facilitates talkgroup calls. As is known, a talkgroup call is a communication that is initiated by a subscriber whereby the subscriber communicates with other subscribers that are members of the talkgroup. Each talkgroup call is assigned a channel resource of the wireless communication system by the system controller. At the end of the talkgroup call, the assigned channel resource may be reassigned to another talkgroup call. As such, the assignment of channel resources to talkgroup calls is dynamic and based upon availability of channel resources at the time of the talkgroup call.

A subscriber may be a mobile or a portable device capable of communicating with a repeater 116 and/or another subscriber. Examples of a mobile or a portable device include an in-car or a handheld radio, a radio telephone and a push-totalk (PTT) device. Subscribers may be organized in a number of ways so as to facilitate communications. A talkgroup represents one type of organization. As used herein, a talkgroup is a group of subscribers who share common characteristics. Examples of common characteristics include a common functional responsibility, a geographical area, and a working shift. Further, another example of a common characteristic is that a system operator of the wireless communication system 100 set up the talkgroup with certain subscribers and such a talkgroup is defined by the system operator.

For example, referring to FIG. 1, subscribers 102-104 may form a talkgroup termed "A" if the subscribers are all used by a group that shares common characteristics, e.g. they are all fire fighters. As such, at the time of a talkgroup call, subscribers in talkgroup A utilize a specific channel resource that is different than the channel resource used by other talkgroup calls. Another example, subscribers 106-112 may form another talkgroup termed "B" if the subscribers are all used by a group that shares a common geography, e.g. the west side of Chicago. As such, at the time of a talkgroup call, subscribers in talkgroup B communicate on a channel resource that is dedicated for the subscribers in talkgroup B. In any case, the subscribers in talkgroup A are separate and independent from the subscribers in talkgroup B.

The repeater 116 is an electronic device that receives a radio frequency (RF) signal and retransmits the RF signal to facilitate transmissions among the subscribers in the wireless communication system 100. As is known to one of ordinary skill in the art, a repeater 116 may also be referred to as a base radio, a base station, or a tower. The repeater 116 is generally fixed and provides for communicating data, control, and voice. In any case, a repeater 116 repeats information transmitted by one subscriber of the talkgroup to the other subscribers listening to the talkgroup. In addition, the repeater 116 repeats information transmitted between the system controller 118 and the subscribers in the wireless communication system.

The system controller 118 acts as the system coordinator and is responsible for allocating subscribers 102-114 to channel resources so that the subscribers may communicate amongst each other. The system controller 118 is also responsible for knowing to which channel resource each of the subscriber units are assigned (e.g. a specific channel, a channel resource, and/or a repeater 116) and for controlling other features typically found in a modern wireless communication system 100 (e.g. handling phone patches, coordinating groups of radios in emergency situations, etc.).

Further, the system controller 118 may have a database for maintaining a list of communications and operational relationships for each of the communications. As used herein, operational relationship means information identifying associations between communications and whether a specific communication is related to another communication. Specifically, if the communications in the wireless communication system comprise of talkgroup calls, then this database may maintain a list of talkgroups (in addition to other types of communications) and operational relationships of the talkgroups. In one embodiment, the operational relationship conveys whether a user of the subscriber participating in one talkgroup is interested in monitoring another communication. In any case, the operational relationship may be classified as either a "required" association or an "optional" association. A required association means that a user needs to participate in and monitor another communication. An optional association means that a user desires, but does not require, to participate and monitor another communication.

A required association means that a communication is necessarily related to another communication in the wireless communication system. For example, a subscriber for fire personnel at an incident scene may participate in a talkgroup with other subscribers for fire personnel at the incident scene while requiring the ability to monitor a talkgroup for police personnel at the same incident scene. Participating in a police personnel talkgroup at the same incident scene may be necessary and/or critical for the fire personnel at the same incident scene. In contrast, an optional association means that a talkgroup call is related to another talkgroup call but the relationship is desirable, but not required. For example, a subscriber for fire personnel at an incident scene may participate in a talkgroup with other subscribers for fire personnel at the incident scene while desiring to monitor a data channel having text messages for fire personnel in an adjacent geographical area. Participating in a communication about an adjacent geographical area talkgroup may not be necessary for the fire personnel at an incident scene.

To facilitate the ability to maintain operational relationships, the system controller 118 may maintain a table identifying the associations for each communication in the wireless communication system. For example, the table may list that a first talkgroup, e.g. talkgroup A, has a required relationship to a second talkgroup, e.g. talkgroup B, and that the first talkgroup has an optional relationship to a third talkgroup, e.g. talkgroup C. In another example, the table may list that a first talkgroup, e.g. talkgroup A, has a required relationship to a data channel, e.g. text messaging, and that the first talkgroup has an optional relationship to a control channel. In one example, there is a limit to the number of associations that may be maintained by the system controller 118. In another example, there is a limit to the number of communications that a specific subscriber can be associated with. In any case, the operational relationships may be provisioned in the system controller or may be received by the system controller in a request from a subscriber.

To facilitate the ability to allocate channel resources, the system controller 118 may maintain a table of channel resources. The table may identify whether a channel resource is available. As used herein, available means that the channel resource is idle, open, vacant, reserved, or is otherwise free to be assigned to a communication, e.g. a talkgroup call. The table may further indicate associations between channel resources. For example, the table may list that a first channel resource is being used for a first communication and that a second channel resource, which is associated with the first channel resource, is available. The table may further identify whether a channel resource has been reserved for future use.

The channel resources of the wireless communications system carry the communications of the wireless communication system, e.g. on a channel of the wireless communication system. Where the wireless communication system 100 is a Frequency Division Multiple Access (FDMA) wireless communication system, the channel resource is a specific frequency range of an RF spectrum and a channel is a number of channel resources, e.g. multiple frequency ranges. Where the wireless communication system 100 is a Time Division Multiple Access (TDMA) wireless communication system, the channel resource is a timeslot and a channel is a number of channel resources, e.g. timeslots. In one example, in a 2 slot TDMA wireless communication system, a channel resource identifies a timeslot and a channel identifies a frequency range carrying multiple time slots. In any case, a timeslot or a channel resource in a TDMA wireless communication system is a period of time on a specific radio frequency of the wireless communication system. Whether a channel resource is defined as a timeslot or a frequency range, a channel resource is a basic unit of a channel and a channel is a number of channel resources. Specifically, a channel is defined as multiple channel resources that are able to be monitored by one receiver, e.g. at a subscriber. Even though an embodiment of the present invention is generally described with reference to TDMA, alternatively, the wireless communication system 100 may adhere to other wireless protocols. For example, the wireless communication system 100 may adhere to a Frequency Division Multiple Access (FDMA) wireless communication system. Similarly, the wireless communication system 100 may adhere to a Orthogonal Frequency Division Multiplexing (OFDM) system or a Code Division Multiple Access (CDMA) system.

Figure 2:
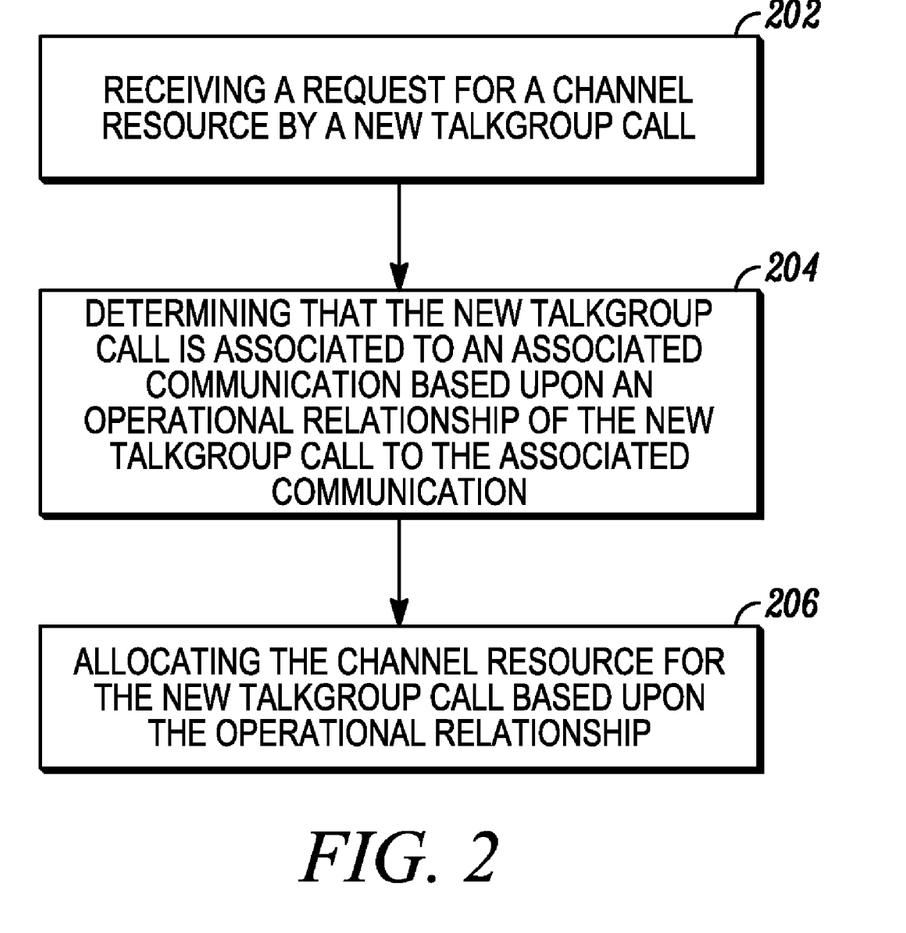
FIG. 2 illustrates a flow diagram of an operation of a system controller configured in accordance with one example of the invention.

FIG. 2 illustrates a flow diagram of an operation of the system controller 118 of the wireless communication system 100 in accordance with one example of the invention. The system controller 118 receives a request for a channel resource when a subscriber begins a transmission, e.g. by pressing PTT. As is known, pressing PTT sends a request for a channel resource to the system controller 118 (Block 202). In an example, the request includes information about which talkgroup the subscriber unit has selected, e.g. for subscriber 102, talkgroup A has been selected, and is called a request for a talkgroup call. In one embodiment, the request also contains information about the operational relationship of the talkgroup call, e.g. whether the talkgroup call is associated with other communications in the wireless communication system. In such an embodiment, if the request is associated with other communications, the request may include information identifying the operational relationships of the associated communications.

Once the request is received by the system controller 118, the system controller 118 determines that the new talkgroup call is associated to an associated communication based upon the operational relationship of the new talkgroup call to the associated communication (Block 204). As mentioned, the operational relationship identifies associations and whether the associations are required or optional. In one embodiment, this determination is made by utilizing a table in the system controller 118 (as mentioned previously) which maintains the operational relationship information for the wireless communication system.

In any case, the system controller 118 of the wireless communication system 100 allocates the channel resource for the new talkgroup call based upon the operational relationship (Block 206), if a channel resource is available. In one example, allocating a channel resource for the new talkgroup call based upon the operational relationship means to assign the new talkgroup call to a channel resource that is available and associated with a channel resource of the associated communication. For example, if the associated communication is active, e.g. a talkgroup call, in the wireless communication system 100 on a channel on a first channel resource, then the new talkgroup call is allocated to a second channel resource on the same channel. If the associated communication is not active in the wireless communication system, then the new talkgroup call is allocated to a channel that has two channel resources available, one for the new talkgroup call and one reserved for the associated communication. Regardless of whether the associated communication is active in the system or not, if a channel resource is available, the new talkgroup call is allocated to a channel resource that is associated to the channel resource for the associated communication ("associated channel resource").

By allocating channel resources so that associated communications are assigned to associated channel resources, participating in one talkgroup call and monitoring other communications is facilitated. By keeping the associated communications on associated channel resources, a user of a subscriber can participate in the new talkgroup call while monitoring associated communications, and vice versa. As used herein, monitoring means to detect presence of activity, e.g. by deciphering signaling. If a channel resource is idle, then there is no activity.

Figure 3:
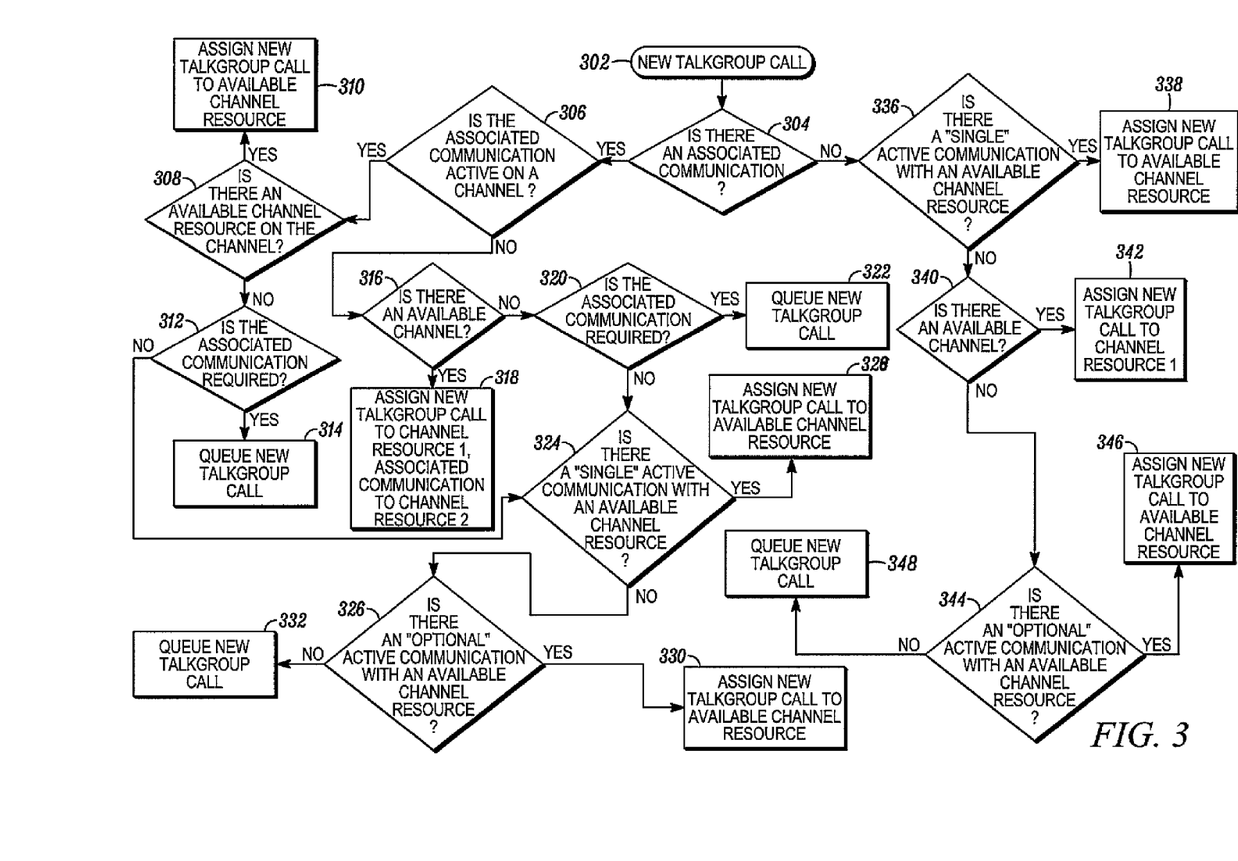
FIG. 3 illustrates a flow diagram of the determining and allocating operations of a system controller configured in accordance with one example of the invention.

FIG. 3 illustrates a flow diagram of the determining and allocating operations of a system controller 118 configured in accordance with one example of the invention. In one example, the step of determining that the new talkgroup call is associated with the associated communication is based upon an operational relationship, as described above, further comprises the decision steps (e.g. steps in diamond-shaped boxes) in FIG. 3. In one example, the step of allocating the channel resource for the new talkgroup call based upon the operational relationship, as described above, further comprises the action steps (e.g. steps in rectangular-shaped boxes) in FIG. 3.

Referring to FIG. 3, when the system controller 118 has received a new talkgroup call (Block 302) and determined that the new talkgroup call is associated to an associated communication (Block 304), the system controller 118 determines whether the associated communication is active on a channel (Block 306). If the associated communication is active on a channel (Block 306), then the system controller 118 determines whether there is an available channel resource on the channel (Block 308). If there is an available channel resource on the channel (Block 308), then the new talkgroup call is assigned to the available channel resource (Block 310). If the associated communication is active, but there is not an available channel resource (Block 308), then the system controller determines whether the associated communication is required (Block 312). If the associated communication is required (Block 312), then the new talkgroup call is queued until a channel becomes available (Block 314). If the associated communication is not required (e.g. is optional) (Block 312), then the system controller 118 determines whether the new talkgroup call can be assigned based upon associations of active communications in the wireless communication system, e.g. via Block 324.

If the system controller 118 determines that the new talkgroup call is associated with an associated communication (Block 304), but the associated communication is not active (Block 306), then the system controller 118 determines whether there is an available channel (Block 316). If there is an available channel (Block 316); then the new talkgroup call is assigned a channel resource on the channel and the associated communication is assigned another channel resource on the channel (Block 318). Thus, a channel resource becomes reserved for the associated communication which is not presently active. If there is not an available channel (Block 316), then the system controller determines whether the associated communication is required (Block 320). If the associated communication is required (Block 320), then the new talkgroup call is queued (Block 322) until a channel (not just a channel resource) becomes available. If the associated communication is not required (Block 320), then the system controller determines whether there is a single active communication (e.g. there is a channel already carrying a communication that does not have an association) or an optional active communication (e.g. there is a channel already carrying a communication that has an optional association) with an available channel resource (Blocks 324, 328). If there is, then the system controller assigns the new talkgroup call to the available channel resource (Blocks 326, 330) by first assigning channel resources that are associated with single active communications (Block 324) before assigning channel resources that are associated with optional active communications (Block 3-26328). Otherwise, the new talkgroup call is queued until a channel resource becomes available (Block 332). Thus, talkgroup calls with required associations to other communications are assigned channel resources of an available channel, even if the associated communications are not active in the wireless communication system, and if this is not possible, then the new talkgroup call is queued.

If the system controller 118 has received a new talkgroup call (Block 302) and determined that the new talkgroup call is not associated to an associated communication (Block 304), then the system controller 118 determines whether there is an available channel resource (Blocks 336, 340, 344) to assign the new talkgroup call. If there is a single active communication (e.g. there is a channel already carrying a communication with does not have an association) with an available channel resource, then the new talkgroup call is assigned the available channel resource (Block 338). If this is not possible, an attempt is made to assign the new talkgroup call to a channel resource of an available channel (Block 342). If there are no available channels (Block 340), then the system controller 118 determines whether there are any available channel resources associated with associated communications that have an optional relationship (e.g. there is a channel already carrying a communication that has an optional association) (Block 344). If so, the new talkgroup call is assigned to the available channel resource (Block 346). If there are no "optional" channel resources that are available (Block 344), the new talkgroup call is queued (Block 348) until a channel resource becomes available. In such a manner, assigning channel resources where the new talkgroup call is not associated to an associated communication occurs by assigning a channel resource associated with a single active communication before assigning a channel resource associated with an available channel or a channel resource associated with an optional active communication.

In one example, the system controller 118 receives a request for a channel resource by a new talkgroup call and determines that the new talkgroup call is associated to an associated talkgroup call based upon operational relationships of the new talkgroup call to the associated talkgroup call, e.g. by maintaining a table of operational relationships of talkgroup calls in the system controller. In such a case, the system controller 118 allocates the channel resource for the new talkgroup call based upon the operational relationship. Similar to the decision steps shown in FIG. 3, the system controller determines whether an associated talkgroup call exists in the wireless communication system, whether the associated talkgroup call is active on a channel, whether the channel has an available channel resource, whether the associated talkgroup call is required, etc. in order to allocate the channel resources in the wireless communication system for the new talkgroup call.

In another example, the system controller 118 receives a request for a timeslot by a new talkgroup call and determines that the new talkgroup call is associated to an associated communication based upon operational relationships of the new talkgroup call to the associated communication. In such a case, the system controller 118 allocates timeslots in a TDMA wireless communication system for the new talkgroup call based upon the operational relationship. Similar to FIG. 3, the system controller allocates timeslots after determining whether an associated communication exists in the wireless communication system, whether the associated communication is active on a channel, whether the channel has an available timeslot, whether the associated communication is required, etc. in order to allocate the timeslots in the TDMA wireless communication system for the new talkgroup call. Thus, with reference to FIG. 3, the terms channel resources and timeslots may be used interchangeably.

In any case, by allocating channel resources so that associated communications are assigned to associated channel resources, participating in a talkgroup call and monitoring another communication is facilitated. For example, a subscriber may monitor one talkgroup call while participating in a second talkgroup call.

In the foregoing specification, specific examples of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for dynamically allocating channel resources in a wireless communication system having a plurality of available channels, each channel having a plurality of channel resources, the method comprising:
   receiving a request for a channel resource on a channel by a new talkgroup call;
   determining that the new talkgroup call is associated with another communication based upon a defined operational relationship between the new talkgroup call and the another communication; and
   allocating channel resources for the new talkgroup call based upon the defined operational relationship and an availability of channel resources across the plurality of channels,
   wherein the defined operational relationship is one of required and optional, where required indicates that channel resources for the new talkgroup should not be allocated unless sufficient channel resources exist on a first particular channel in the plurality to support both the new talkgroup and the another communication, and where optional indicates a preference to allocate channel resources for both the new talkgroup and the another communication on the first particular channel but providing for the new talkgroup to be allocated despite insufficient channel resources for both the new talkgroup and the another communication.

2. The method of claim 1, wherein allocating further comprises assigning the new talkgroup call to first channel resources on the first particular channel and assigning the another communication to second channel resources on the first particular channel.

3. The method of claim 2, further comprising at a subscriber:
   participating in the new talkgroup call using the first channel resources on the first particular channel; and
   monitoring the another communication using the second channel resources on the first particular channel.

4. The method of claim 1, wherein the steps of receiving, determining, and allocating are performed by a system controller in the wireless communication system.

5. The method of claim 1, wherein allocating further comprises queuing the new talkgroup call until sufficient channel resources becomes available, if the operational relationship between the new talkgroup call and the another communication is required and insufficient channel resources are available for both the new talkgroup and the another communication on each of the plurality of available channels.

6. The method of claim 1, wherein allocating further comprises assigning the new talkgroup call to first channel resources on the first particular channel and reserving second channel resources on the first particular channel for the another communication, if the another communication is not currently active in the wireless communication system.

7. The method of claim 1, wherein allocating further comprises assigning the new talkgroup call to first channel resources on the first particular channel, even though second channel resources on the first particular channel has already been assigned to a different communication and insufficient channel resources are available on the first particular channel for the another communication, if the defined operational relationship is optional.

8. A method for dynamically allocating channel resources in a wireless communication system having a plurality of available channels, each channel having a plurality of channel resources, the method comprising:
receiving a request for a channel resource on a channel by a new talkgroup call;
determining that the new talkgroup call is associated with another talkgroup call based upon a defined operational relationship between the new talkgroup call and the another talkgroup call; and
allocating channel resources for the new talkgroup call based upon the defined operational relationship and an availability of channel resources across the plurality of channels,
wherein the defined operational relationship is one of required and optional, where required indicates that channel resources for the new talkgroup call should not be allocated unless sufficient channel resources exist on a first particular channel in the plurality to support both the new talkgroup call and the another talkgroup call, and where optional indicates a preference to allocate channel resources for both the new talkgroup and the another talkgroup on the first particular channel but providing for the new talkgroup call to be allocated despite insufficient channel resources for both the new talkgroup call and the another talkgroup call.

9. A method for dynamically allocating timeslots in a TDMA wireless communication system having a plurality of available channels, each channel having a plurality of timeslots, the method comprising:
receiving a request for a timeslots by a new talkgroup call;
determining that the new talkgroup call is associated with another communication based upon a defined operational relationship between the new talkgroup call and the another communication; and
allocating timeslots for the new talkgroup call based upon the defined operational relationship and an availability of timeslots across the plurality of channels,
wherein the defined operational relationship is one of required and optional, where required indicates that time slots for the new talkgroup should not be allocated unless sufficient timeslots exist on a first particular channel in the plurality to support both the new talkgroup and the another communication, and where optional indicates a preference to allocate timeslots for both the new talkgroup and the another communication on the first particular channel but providing for the new talkgroup to be allocated despite insufficient timeslots for both the new talkgroup and the another communication.

10. The method of claim 9, wherein allocating further comprises assigning the new talkgroup call to a first timeslot of a TDMA channel and assigning a second timeslot of the TDMA channel to the another talkgroup.

11. The method of claim 9, further comprising at a subscriber:
participating in the new talkgroup call using the first timeslot; and
monitoring the associated communication using the second timeslot.

12. The method of claim 9, wherein allocating further comprises assigning the new talkgroup call to a first timeslot on a particular TDMA channel even though a second timeslot on the particular TDMA channel is already assigned to a communication not associated with the new talkgroup call.

13. The method of claim 1, wherein:
when the another communication is already active and using first channel resources on the particular channel and the particular channel contains sufficient second channel resources prior to allocation, the second channel resources are allocated on the particular channel along with the first channel resources, and
when the another communication is not already active, the allocating further comprises determining that sufficient first and second channel resources are available on the first particular channel and then allocating both the first and second channel resources on the first particular channel for the new talkgroup call and the another communication, respectively.

14. The method of claim 1, wherein when the operational relationship is required, the new talkgroup call is not created, but is instead queued, when one of:
the another communication is not already active and insufficient channel resources exist on any one of the plurality of available channels to support both the new talkgroup and the another communication and
the another communication is already active on the first particular channel, and insufficient additional channel resources are available on the first particular channel to support the new talkgroup call.

15. The method of claim 1, wherein the allocating the channel resource for the new talkgroup call is further based upon whether the another communication is already currently active.

16. The method of claim 1, the method further comprising maintaining a database of information comprising channel resources available, existing talkgroups, which channel resources are associated with each existing talkgroup, and stored operational relationships between the talkgroups;
wherein when the defined operational relationship is optional and insufficient channel resources exist on one of the plurality of available channels for both the new talkgroup call and the another communication, the method further comprises:
determining, via the information in the database, whether one of a single active communication and an optional active communication is present on one of the plurality of channels, the single active communication representing a second particular channel that has allocated first channel resources for a first existing talkgroup that is not associated with another communication and which has second channel resources available, the optional active communication representing a third particular channel that has allocated first channel resources for a second existing talkgroup and second channel resources for another communication optionally associated with the second existing talkgroup, and allocating one of the second channel resources of the second particular channel and the second channel resources of the third particular channel for the new talkgroup.

17. The method of claim 16, wherein when the single active communication and the optional active communications are both present, allocating the second channel resources of the second particular channel rather than the second channel resources of the third particular channel.

18. The method of claim 1, wherein the defined operational relationship is included in the request for channel resources by the new talkgroup call.

19. The method of claim 8, wherein the defined operational relationship is included in the request for channel resources by the new talkgroup call.

20. The method of claim 9, wherein the defined operational relationship is included in the request for timeslots by the new talkgroup call.

* * * * *

UNITED STATES PATENT AND TRADEMARK OFFICE
CERTIFICATE OF CORRECTION

| | | |
|---|---|---|
| PATENT NO. | : 8,027,696 B2 | Page 1 of 1 |
| APPLICATION NO. | : 11/965875 | |
| DATED | : September 27, 2011 | |
| INVENTOR(S) | : Wiatrowski et al. | |

It is certified that error appears in the above-identified patent and that said Letters Patent is hereby corrected as shown below:

In Column 6, Line 48, delete "(Block 316);" and insert -- "(Block 316)," --, therefor.

In Column 7, Line 4, delete "(Block 3-26328)." and insert -- "(Block 328)." --, therefor.

In Column 10, Line 42, in Claim 14, delete "communication" and insert -- communication, --, therefor.

In Column 11, Line 9, in Claim 16, delete "talkgroup." and insert -- talkgroup call. --, therefor.

Signed and Sealed this
Eighth Day of January, 2013

David J. Kappos
*Director of the United States Patent and Trademark Office*